Nov. 4, 1969 P. D. LE MASTERS 3,477,022
ELECTRONIC SPEEDOMETER AND ODOMETER CONTROL CIRCUIT
Filed May 16, 1967

INVENTOR.
Paul D. LeMasters
BY
Robert E. Fowler
ATTORNEY

United States Patent Office 3,477,022
Patented Nov. 4, 1969

3,477,022
ELECTRONIC SPEEDOMETER AND ODOMETER CONTROL CIRCUIT
Paul D. Le Masters, Kokomo, Ind., assignor to General Motors Corporation, Detroit, Mich., a corporation of Delaware
Filed May 16, 1967, Ser. No. 638,870
Int. Cl. G01r 11/46
U.S. Cl. 324—70
2 Claims

ABSTRACT OF THE DISCLOSURE

An electronic speedometer and odometer operated by pulses produced by rotation of the drive shaft which system counts said pulses and provides an analog output for indicating speed and totals the number to indicate distance.

DESCRIPTION OF THE INVENTION

Most speedometers currently in use on automobiles utilize mechanical drives from the drive shaft to a speedometer and odometer combination on the instrument panel to advise the driver of the speed at which he is driving and the distance he has covered. As the parts wear the accuracy decreases. Further, a mechanically rotating shaft in a housing is a subject of considerable service due to breakage, noise, friction and other difficulties. In addition this mechanical drive shaft cannot be too long or the difficulties multiply.

If the mechanical drive shaft can be eliminated and an electrical conductive connection substituted, many difficulties are overcome. The speedometer may be placed as far as desired from the point of generation of pulses on the shaft and the question of mechanical wear is not present.

Electrical systems for measuring speed and distance of movable objects such as aircraft and ships are known as shown in Sperry 2,983,867. However, the present system differs therefrom and is adapted for land vehicles such as automobiles.

Figure 1:
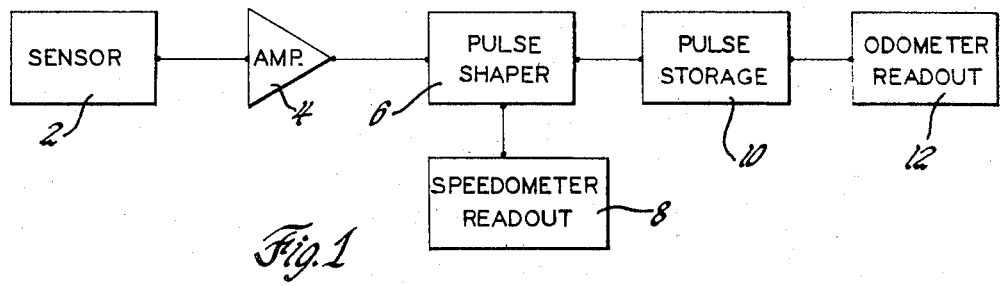
Figure 2:
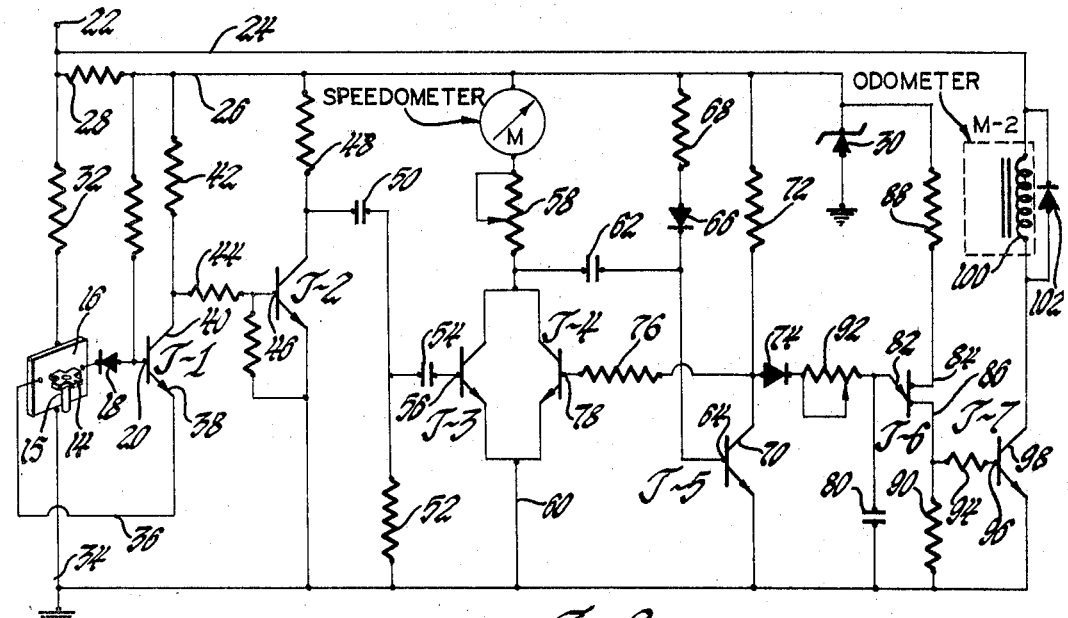
Figure 3:
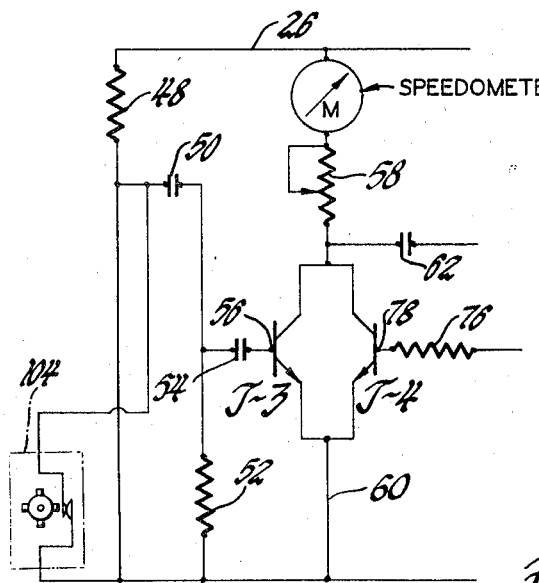

In the drawings:
FIGURE 1 is a block diagram showing the essential parts of the system;
FIGURE 2 is a circuit diagram of a complete electronic speedometer and odometer system embodying the invention; and
FIGURE 3 is a circuit diagram showing a modified form of pulse generating means only.

DESCRIPTION OF THE PREFERRED EMBODIMENT

In a mobile body such as an automotive vehicle a rotating part such as the drive shaft is selected for generating and feeding pulses whose rotation is proportional to the speed of the vehicle and whose total rotation is proportional to distance traveled. On the drive shaft there is mounted a pulse generator and sensor such as indicated in FIGURE 1 at 2. The sensor or pulse generator 2 which produces pulses proportional to vehicle speed feeds into an amplifier 4 where the signal produced thereby is first amplified and then applied to a pulse-shaper section 6. The object of the pulse-shaper system is to produce a series of equal length pulses and intermediate spaces which can be read and totaled. This section has two outputs, one is directly connected to a speedometer indicator or readout 8. This meter or readout provides an indication of the momentary speed of the vehicle. As a second output, section 6 also feeds into a pulse storage section 10 whose ultimate purpose is to produce a signal which will read the total distance which the vehicle has traveled in a certain time period. The pulse-storage section 10 therefore is connected directly into an odometer section 12. These diagrammatically illustrated portions of the total system in FIGURE 1 form the total electronic system of the invention.

Referring now to the specific circuitry involved in these sections as illustrated in FIGURE 2 the sensor 2 may take the form of magnetic projections 14 carried on the drive shaft 15 of the car which are adapted to rotate in the vicinity of a pickup means such as, for example, a Hall effect device 16. There may be one magnet on the periphery of the shaft or a series depending upon how many pulses it is desired to create during one rotation of the shaft. As these magnets rotate past the surface of the Hall device each creates a pulse in the current flowing through the same which pulse is applied through a diode 18 to the base 20 of an amplifying transistor T-1.

Voltage for energizing the system is connected to terminal 22 and produces on line 24 energizing power and on line 26 regulated power, line 26 being connected to terminal 22 through a resistor 28. A Zener diode 30 is connected between line 26 and ground to prevent rapid changes in voltage on the line and to regulate the same. A biasing resistor 32 is connected between terminal 22 and one of the terminals of the Hall device 16, the opposite terminal of which is connected to ground through line 34. Of the remaining two terminals of the Hall device, one is connected through line 36 to the emitter 38 of transistor T-1 and the second as previously mentioned through the diode 18 to the base 20.

The collector 40 of transistor T-1 is supplied with energizing power through biasing resistance 42. Collector 40 is likewise connected through resistance 44 to the base 46 of a second transistor T-2 in the amplifying section. These two transistors are connected as a Schmitt trigger circuit so that as one transistor conducts the other is cut off. Transistor T-2 is energized from power line 26 by biasing resistor 48 to its collector and its emitter is directly grounded. The two transistors T-1 and T-2 form the amplifier section 4 as shown in FIGURE 1. The next three transistors T-3, T-4 and T-5 form the pulse-shaping section 6. They are connected to the amplifier section 4 through a coupling condenser 50 which joins the collector of transistor T-2 to the base of the transistor T-3. A resistor 52 is connected in series with the capacitor 50 to ground and provides a discharge path therefor.

Capacitor 54 connects the juncture of condenser 50 and resistance 52 with the base 56 of transistor T-3. The two collectors of transistors T-3 and T-4 are commonly connected together and through a variable resistance 58 to a milliammeter M, the opposite terminal of which is connected to the regulated power line 26. This milliammeter M acts as a speedometer and its scale may be calibrated in miles per hour. In like manner the two emitters of transistors T-3 and T-4 are commonly connected together and to ground through line 60. The collectors of transistors T-3 and T-4 are directly connected through a condenser 62 to the base 64 of transistor T-5. This base is also connected through blocking diode 66 and charging resistor 68 to regulated power line 26. Collector 70 of transistor T-5 is connected through biasing resistor 72 to regulated power line 26 and to the anode of diode 74 and through a resistance 76 to the base 78 of transistor T-4. This completes the multivibrator pulse-shaper system whose operation will be later described in detail.

The pulse-storage section consists of the capacitor 80 and the blocking diode 74, said capacitor 80 charging up due to a series of pulses being impressed thereon from the pulse-shaping circuit and then when it discharges causing an electromechanical counter M-2 to operate to record a certain distance. The capacitor 80 is connected to the control electrode or emitter 82 of a unijunction transistor whose base$_2$ and base$_1$ electrodes 84 and 86 are connected to the power line 26 and ground respectively through biasing resistors 88 and 90. A variable resistance 92 is interposed between the blocking diode 74 and the storage capacitor 80. The output of the unijunction transistor is fed into a last amplifier stage T-7 by having the base$_1$ electrode 86 connected through resistor 94 to the base 96 of transistor T-7. The collector 98 of transistor T-7 is connected through the relay coil 100 to the unregulated power line 24. A diode 102 is connected across the relay coil 100 to quench any inductance spike that may be applied to the system when the counter is de-energized.

In the operation of the system, as the shaft rotates the various magnets 14 rotate past the Hall effect device 16 and each provides a negative signal to the base of the transistor T-1. With the terminal 22 connected to a suitable power source and no pulse present transistor T-1 is conductive and transistor T-2 non-conductive. However, as the shaft rotates when a magnet or projection 14 passes the Hall device the negative signal is produced and applied to the base 20 sufficient to cause the transistor T-1 to become non-conductive. This changes the voltage on its collector 40, increasing the same, which is directly connected to the base 46 of the transistor T-2 and transistor T-2 turns on, since T-1 and T-2 constitute, as previously described, a Schmitt trigger. With T-2 on, condenser 50 which has been charged now discharges through T-2 to ground.

As the magnet or projection 14 continues past the Hall device in its rotation the output of the Hall device 16 becomes positive and T-1 turns on again and T-2 turns off. Condenser 50 recharges and the positive pulse across the resistor 52 turns transistor T-3 on. When transistor T-3 is turned on current starts to flow through the milliammeter-speedometer M and capacitor 62 starts discharging through T-3 to ground which applies a negative voltage to the base of T-5. T-5 thus turns off and remains off until capacitor 62 discharges. The time transistor T-5 remains off depends on the time constant determined by the R$_1$C circuit formed of capacitor 62 and resistance 68. Transistor T-4 is turned on by the voltage applied through resistance 76 and it provides a pulse of current through the milliammeter-speedometer M-1 for the same length of time that T-5 is turned off. Thus, transistors T-3, T-4 and T-5 comprise a monostable multivibrator which provides a constant output pulse width over an input frequency range (0–400 cycles per second). Thus, the reading on the meter M-1 indicates the momentary speed of the vehicle and acts as a speedometer.

As for the odometer section, capacitor 80 is charged through variable resistance 92 and blocking diode 74 when transistor T-5 is off. Diode 74 prevents the capacitor 80 from discharging when T-5 turns on. It therefore stores up the pulses fed through from the previous portion of the circuit described. The unijunction transistor T-6 is biased to be triggered when the voltage stored in capacitor 80 reaches a certain level. This would be indicative of a certain number of pulses received or a certain number of rotations of the shaft or a certain distance traveled. Transistor T-7 is turned on by a pulse received when T-6 triggers and discharges capacitor 80 through resistance 90. Transistor T-7 energizes the electromechanical odometer counter coil 100 and it therefore would turn or record one figure proportionate to the distance thus keeping track of the total distance the vehicle traveled or the shaft rotated beginning at a certain specific time period.

If it is desired to simplify the pickup mechanism and instead of using a Hall effect device such as suggested, a simple reed switch may be substituted as shown in FIGURE 3. Such a switch as 104 is actuated in the same manner as the Hall effect device 16 by the revolutions of the drive shaft and in that case not only can the Hall effect device be eliminated but the two stages of amplifying means represented by T-1 and T-2 may also be cut out.

As representative of such a simplification the reed switch 104 is shown connected between the ground and the left hand side of condenser 50 and that portion of the circuit involving transistors T-1 and T-2 and the Hall device eliminated. The other parts of the system to the right remain the same and only a sufficient number are shown to indicate the connections in FIGURE 2.

By using this electronic type of construction the mechanical connection normally required between a drive shaft and a speedometer-odometer can be eliminated and the only connection required in order to obtain speedometer and odometer readings will be by electrical cable.

I claim:
1. An electronic speedometer and odometer system for a vehicle having a rotary shaft whose revolutions are proportional to the speed and distance covered by the vehicle; pulse producing means mounted on the shaft; pickup means mounted adjacent the shaft in which pulses are created by said pulse producing means at a frequency proportional to the speed of rotation of the shaft; a source of electrical power; multivibrator pulse squaring means connected to the source of electrical power and to the pickup means to generate equal size pulses, the multivibrator pulse squaring means including first, second and third transistors each having base, emitter, and collector electrodes, the collector electrodes of the first and second transistors being connected together and also the emitter electrodes of the first and second transistor being connected together and the base electrode of the second transistor being connected to the collector electrode of the third transistor, a first condenser connected to the collector electrodes of the first and second transistors and to the base electrode of the third transistor, a resistor connected between the base electrode of the third transistor and the source of electrical power; a meter connected to the multivibrator pulse squaring means and to the source of electrical power and providing an indication of the rate of pulse production; a second condenser to store a plurality of pulses produced by the pulse shaping means; a blocking diode connected between the second condenser and the pulse-shaping means to permit current flow in only one direction; a unijunction transistor connected across the source of electrical power and having a control electrode connected to the second condenser, the unijunction transistor being rendered conductive to develop a trigger pulse only when the charge on the second condenser has reached a certain value proportional to a certain distance of travel of the vehicle; and registering means connected to the unijunction transistor so as to respond to the trigger pulses and indicate the number of units of distance traveled.

2. An electronic speedometer and odometer as defined in claim 1 in which the registering means is an electromechanical counter.

References Cited

UNITED STATES PATENTS

| 2,091,025 | 8/1937 | Breer | 324—70 |
| 2,295,118 | 9/1942 | Le Clair | 324—70 |
| 2,983,867 | 5/1961 | Sperry | 324—70 |
| 3,317,829 | 5/1967 | Kuhrt | 324—70 |
| 3,358,230 | 12/1967 | Wiley | 324—70 |
| 3,396,333 | 8/1968 | Ho | 324—70 |

FOREIGN PATENTS

| 961,244 | 6/1964 | Great Britain. |
| 968,008 | 8/1964 | Great Britain. |

RUDOLPH V. ROLINEC, Primary Examiner

MICHAEL J. LYNCH, Assistant Examiner

U.S. Cl. X.R.

235—92